Patented Mar. 3, 1925.

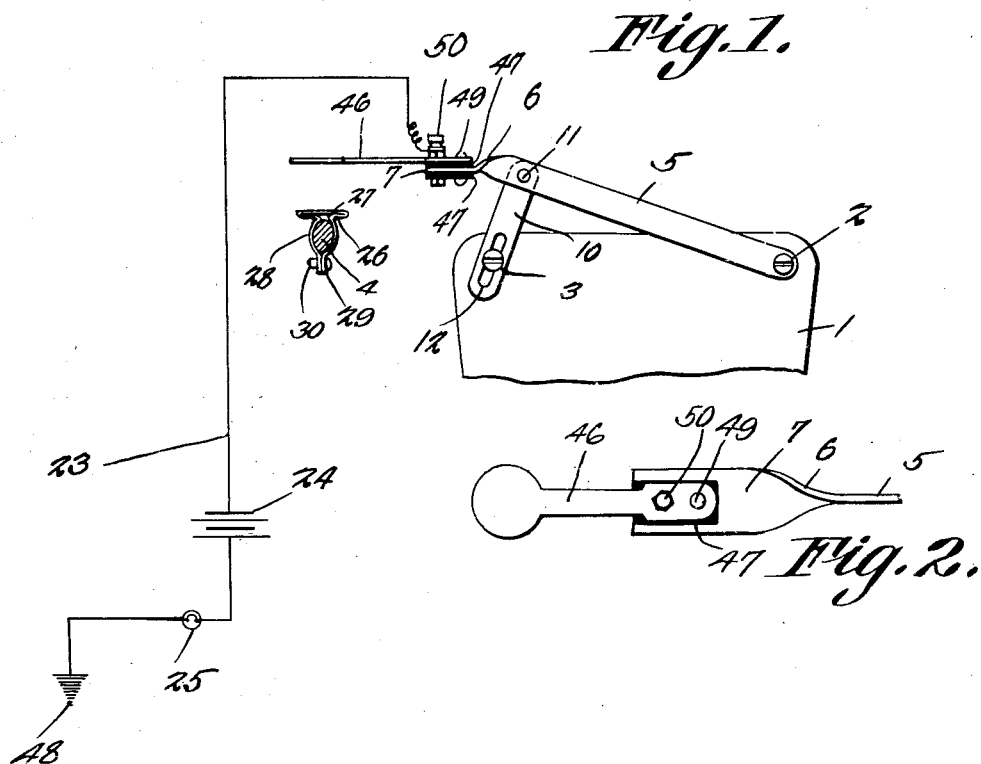

1,528,276

UNITED STATES PATENT OFFICE.

CLARENCE O. SOLIE, OF STANLEY, WISCONSIN.

SWITCH.

Application filed December 30, 1920. Serial No. 434,173.

*To all whom it may concern:*

Be it known that I, CLARENCE O. SOLIE, a citizen of the United States, residing at Stanley, in the county of Chippewa and State of Wisconsin, have invented a new and useful Switch, of which the following is a specification.

This invention aims to provide a novel form of adjustable switch adapted to be mounted on the transmission case of a motor propelled vehicle, to cooperate with the reverse pedal of the vehicle.

In the accompanying drawings:—

Figure 1 shows in elevation, a device constructed in accordance with the invention, the pedal appearing in section, and the circuit being shown diagrammatically; Figure 2 is an elevation showing the spring tongue and the part which carries the tongue.

Referring to Figure 1 the numeral 1 denotes a support, which may be the cover plate for the transmission box of a Ford automobile, the cover plate being held in place by securing elements 2 and 3. The stem of the reverse pedal or lever is marked by the numeral 4.

In carrying out the invention, there is provided an arm 5, twisted as indicated at 6, so that the end 7 of the arm will stand edgewise, in an approximately vertical position. The numeral 10 denotes a brace, one end of which is pivoted for adjustment to the arm 5, as indicated at 11. In the rear end of the brace 10, an elongated slot 12 is fashioned. The securing element 2 holds one end of the arm 5 on the cover plate 2, the securing element 3 passing through the slot 12 and serving to hold the brace 10 on the cover plate 1.

The end 7 of the arm 5 is disposed between insulating blocks 47. One end of a spring tongue 46 is mounted on one of the insulating blocks. The tongue 46 is held on the end 7 of the arm 5 by a binding post 50 and a securing element 49, the binding post and the securing element, however, being out of electrical contact with the end 7. A conductor 23 leads from the binding post 50 and is grounded as shown at 48. A lamp 25 is interposed in the conductor 23, the lamp preferably being located at the rear end of the vehicle. The numeral 24 denotes a battery or other force of electrical energy, interposed in the conductor 23.

A terminal 26 is mounted on the stem 4 of the reverse pedal and is adapted to cooperate with the spring tongue 46. The terminal 26 may be formed from a single strip of metal, bent to form a foot 27, the foot being extended into arms 28 terminating in flanges 29, the flanges 29 being connected by a bolt 30 or the like, the bolt constituting means for clamping the terminal on the stem 4 of the reverse pedal.

When the pedal 4 is in any position except reverse, the terminal 26 is out of contact with the spring tongue 46, the circuit, including the conductor 23 is open, and the lamp 25 is not lighted. When, however, the pedal 4 is moved to reverse position, the part 27 of the terminal 26 is brought into engagement with the free end of the spring tongue 46. Then, the circuit is grounded at one end, as indicated at 48, and is grounded at the other end through the pedal 4, the lamp 25 being lighted, for the purpose of warning a person at the rear of the vehicle, that the vehicle is about to be set aback.

The arm 5 may be swung on its mounting 2, the brace 10 sliding on the element 3. In this way, the spring tongue 46 may be adjusted with respect to the terminal 26 on the pedal 4, to allow for the throw of the pedal. When the securing elements 2 and 3 are tightened up, the arm 5 and parts carried thereby will be held in the position to which they may have been adjusted.

Having thus described the invention, what is claimed is:

In a switch, a support, an arm, means for mounting one end of the arm pivotally on the support, for swinging adjustment in a fixed plane and for clamping said end of the arm on the support, a brace having an elongated slot in its inner end, means for connecting the outer end of the brace pivotally to the intermediate portion of the arm, a clamping element adjustable in the support and mounted in the slot, the clamping element engaging the brace to hold the brace and the arm in adjusted positions, a tongue secured to the other end of the arm, means for insulating the tongue from the arm, a lever mounted at one end of the support to swing in a direction substantially at right angles to said plane, the brace being spaced inwardly from said end of the support to permit the tongue to be of a maximum length, and a terminal on the arm and co-operating with the tongue.

In testimony that I claim the foregoing as my own, I have hereto affixed my signature in the presence of two witnesses.

CLARENCE O. SOLIE.

Witnesses:
 ALICE G. WILCOX,
 H. MEGUM.